July 15, 1958 H. E. GRESHAM ET AL 2,842,835
ARTICLES OF TITANIUM ALLOYS
Filed June 20, 1955
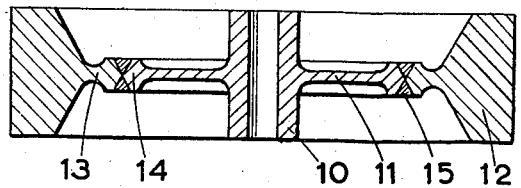
FIG.1
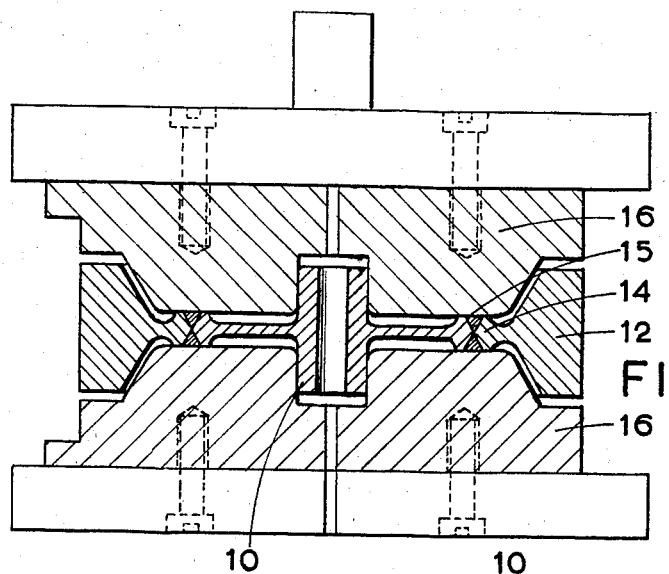
FIG.2
FIG.2a.
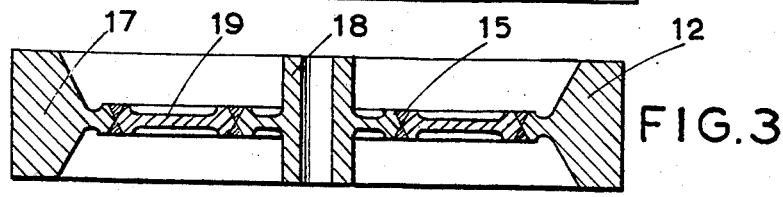
FIG.3
INVENTORS,
Harold Ernest Gresham,
Douglas Wilson Hall
BY
ATTORNEYS United States Patent Office 2,842,835
Patented July 15, 1958

2,842,835

ARTICLES OF TITANIUM ALLOYS

Harold Ernest Gresham, Little Eaton, and Douglas Wilson Hall, Tynemouth, England, assignors to Rolls-Royce Limited, Derby, England Application June 20, 1955, Serial No. 516,588

Claims priority, application Great Britain July 1, 1954

6 Claims. (Cl. 29—159.01)

This invention is for the manufacture of (forged) articles from titanium base alloys, i. e. alloys containing at least 80% titanium, and applies particularly to engineering parts having sections of different thickness where the parts of thinner section would normally be made by machining away the metal. With titanium alloys such a process is wasteful since the turnings machined off are unusable and there is thus considerable loss of expensive alloy.

According to this invention the method of forming the article comprises prefabricating the article in parts adapted to be joined together by welding, the parts at the places where the welds are to be formed being of greater cross-section than will be ultimately required, and being grooved or likewise formed to receive welding filler material, welding the parts together using a filler material of titanium alloy (and preferably the same alloy as the parts to be welded), forging the welded portions down to the size required and annealing them. Preferably the parts are grooved on each side of the joint, the second groove being formed after welding in the first.

If the welding is carried out in stages an additional annealing operation is preferably carried out between each two stages.

Preferably the joint portions are of the order of twice the thickness ultimately required but they may be less.

The invention has been found particularly suitable in the manufacture of a forged engineering part consisting of a disc wheel having a central hub and a rim both of comparatively thick cross-section joined by a comparatively thin circular disc web or diaphragm (hereinafter refered to as a "disc") the whole made out of an alloy of which the composition is as follows:

| | Percentage by weight of the whole alloy |
|---|---|
| Chromium | 2.7 |
| Iron | 1.3 |
| Carbon | 0.02 |
| Oxygen | 0.25 |
| Nitrogen | 0.02 |
| Titanium | Balance |

Other alloys, however, may be used which are suitable for such articles.

It would be very difficult if not impossible to forge such a wheel in one unit to a size approaching finished dimensions owing to the thinness of the disc or diaphragm portion.

According to one form of this invention the wheel is made in two parts one consisting of the hub and greater portion of the disc and the other of the rim and a smaller portion of the disc. These disc portions are, in the region of the junction, enlarged to about twice the thickness of the rest of the disc portions, and the enlarged edges are cut away to leave initially on one side of the junction an annular groove which may be V-shaped in cross-section suitable for receiving the welding filler material. The welding is effected using an argon arc torch with a separate argon gas supply to the back of the weld. The filler material used is also the alloy of the composition mentioned above. Two welding runs are made in the V-shaped groove and between each run the wheel is charged into a furnace at a suitable temperature in the range 600° C. to 1000° C., e. g. of the order of 700° C. and allowed to cool with the furnace in order to remove contractional stresses. Thereafter a second V-shaped groove is formed on the other side of the disc and the welding and annealing processes repeated.

Some articles may be welded with two runs, one on each side with interstage anneal above.

As an alternative to making the wheel in two portions it might be made in three, the hub, the disc and the outer rim, the initially thickened welded joints being formed as before described between rim and disc and between disc and hub.

Examples of this invention are illustrated in the accompanying drawings.

Figure 1 shows a vertical section through the disc wheel which is formed of two prefabricated parts immediately after the parts have been welded together.

Figure 2 is a section showing the wheel in a forging die with welded rims or enlargements about to be forged down.

Figure 2a shows a similar section of the wheel in the die after the forging has been completed.

Figure 3 is a section corresponding to Figure 1 of a similar disc wheel made initially in three separate parts.

The disc wheel illustrated in Figures 1, 2 and 2a is made initially in two parts. One part comprises the hub 10 and the greater part 11 of the disc. The second part comprises the rim 12 and a small portion 13 of the disc. The edges of the disc portions are enlarged as shown at 14, the enlargements being about twice as thick as the other parts of the disc.

When the parts are put together as shown in Figure 1 the two enlarged edges make contact and are cut away on one side to form a V-shaped groove in cross-section which is filled by one or more welding runs and cooled from annealing temperature in a furnace. Thereafter a further V-shaped groove is cut on the opposite face and treated similarly. The parts are welded together using an argon arc torch with a separate gas supply to the back of the weld. The welding runs are made two or more on each side leaving the weld finally as shown at 15. After each run the wheel is charged into a furnace at a temperature of the order of 700° C. and allowed to cool with the furnace in order to remove contractional stresses.

The disc and weld are preferably of the same titanium alloy as the remainder of the wheel and after welding the disc wheel will form a homogeneous whole.

When the welding has been completed the enlarged joint portions 14 are forged down in a suitable die 16 to the thickness of the rest of the diaphragm and then the wheel is annealed again at 700° C. for 30 minutes. Finally the disc is machined to smooth it off.

In the example shown in Figure 3 the wheel is constructed in precisely the same manner except that it is initially made in three prefabricated parts. One part 17 comprises the outer rim and a small portion of the disc, another 18 the hub portion and a small portion of the disc and the third 19 the greater portion of the disc and welds are made to join the middle portion 19 to the other two.

The rim of the wheel may be made from a forging (either ring rolled or die) or a ring may be formed by bending a bar into a circular shape and joining the ends by flash butt welding.

The hub, if large enough, could be made by any of the methods described above for the rim and if not large enough for this to be done it can be formed as a die forging.

In the case of the wheel made from two portions, the portion of the disc which is integral with the hub may be made by rolling, while in the case of the wheel made from three portions the diaphragm can be made from cross-rolled plate or sheet, the bore and periphery being thickened to the desired dimension to contain the weld, by upsetting.

The weld in its welded state will be brittle but forging will break down the structure of the weld metal and improve ductility.

This is demonstrated by the following tests results on argon arc welds on separate test pieces and on test pieces taken from a disc wheel as before described.

| Tensile test | As welded separate test piece | Welded and annealed 30 mins. at 700° C. Test separate pieces | Welded and forged. Taken from disc wheel | Welded, forged and annealed 30 mins. at 700° C. Taken from disc wheel |
|---|---|---|---|---|
| Maximum Stress, Tons per square inch | 60 | 73 | 73 | 75.5 |
| Yield point, Tons per square inch | 60 | 70 | 70 | 74 |
| Elongation, percent | 1 | 5 | 6 | 14 |
| Reduction in area, percent | Nil | 2 | 2 | 32 |

We claim:

1. The method of manufacture of a forged article from titanium alloys which comprises prefabricating the article in parts adapted to be welded together, forming the parts at the places where the welds are to be made to greater cross section than the parts of the material adjacent thereto which are too thin for welding, grooving the junction between the parts on one side of the article when placed ready for welding so as to receive welding filler material, welding the parts together using a filler material of titanium alloy, then grooving the other side and welding with filler material of titanium, forging down the junction so that it is of a thickness substantially equal to that of the material adjacent thereto and then annealing the article.

2. The method of manufacturing a forged engineering article of alloy consisting mainly of titanium comprising a wheel having a central hub part and a rim part both of comparatively thick cross-section joined by a circular disc too thin for satisfactory welding, comprising forming the wheel initially in two prefabricated parts one consisting of a hub part and a portion of the disc and the other of the rim part and the remainder of the disc, forming the edges of the disc portions substantially thicker than other parts of said portions, grooving the junctions of said edges on one side to receive welding filler material, welding the parts together using a filler material of similar titanium alloy to the said parts, grooving the other side of the said junction and there welding by using a titanium alloy as a groove filler, forging down the welded junction to the thickness of the remainder of the disc portion and annealing the article.

3. The method of manufacturing a forged engineering article of a titanium alloy consisting largely of titanium, comprising a disc wheel having a central hub part and a rim part both of comparatively thick cross-section joined by a disc too thin for filler welding, making the wheel initially in three prefabricated portions one consisting of the hub part and a portion of the disc, one of the rim part and a further portion of the disc and one of the remaining portion of the disc adapted to fit between the other two portions, forming all portions with enlarged junction edges substantially thicker than other parts of the disc, relieving the said junctions successively on one side to receive the filler material, welding the parts together using a filler material of substantially the same titanium alloy as the parts, then repeating the relieving and welding operations on the other side each following the welding on the first side, forging down the junctions to the thickness of the remainder of the disc portion and annealing the article.

4. The method of manufacture of a forged article from titanium alloys which comprises prefabricating the article in parts adapted to be welded together, forming the parts at the places where the welds are to be formed to not less than twice the thickness of the parts of the material adjacent thereto which are too thin for welding, grooving the junction between the parts when placed ready for welding so as to receive welding filler material, welding the parts together using a filler material of titanium alloy, forging down the junction so that it is of a thickness substantially equal to that of the material adjacent thereto and then annealing the article.

5. The method of manufacture of a forged article from titanium alloys which comprises prefabricating the article in parts adapted to be welded together, forming the parts at the places where the welds are to be made to greater cross section than the parts of the material adjacent thereto which are too thin for welding, grooving the junction between the parts when placed ready for welding so as to receive welding filler material, welding the parts together using a filler material of titanium alloy, annealing the article, forging down the junction so that it is of a thickness substantially equal to that of the material adjacent thereto and then again annealing the article.

6. The method of manufacturing a forged engineering article of a titanium alloy consisting largely of titanium, comprising a disc wheel having a central hub part and a rim part both of comparatively thick cross-section joined by a disc too thin for filler welding, making the wheel initially in three prefabricated portions one consisting of the hub part and a portion of the disc, one of the rim part and a further portion of the disc and one of the remaining portion of the disc adapted to fit between the other two portions, forming all portions with enlarged junction edges substantially thicker than other parts of the disc, relieving the said junctions to receive the filler material, welding the parts together using a filler material of substantially the same titanium alloy as the parts, carrying out the relieving and welding operations in stages, annealing the welded parts after each stage welding operation, forging down the junctions to the thickness of the remainder of the disc portion and annealing the article.

References Cited in the file of this patent

UNITED STATES PATENTS

| 757,135 | Melaun | Apr. 12, 1904 |
| 1,779,607 | Lewis | Oct. 28, 1930 |
| 1,991,556 | Hopkins | Feb. 19, 1935 |
| 2,424,784 | Ware | July 29, 1947 |
| 2,464,836 | Thomas | Mar. 22, 1949 |

OTHER REFERENCES

"Study of Effects of Alloying Elements on the Weldability of Titanium Sheet," May 1954, pages 36–38, published by Wright-Patterson Air Force Base, Ohio.